Feb. 17, 1925.
J. W. FRASER
BIFUNCTIONAL STORAGE BATTERY
Filed May 4, 1922
1,526,539
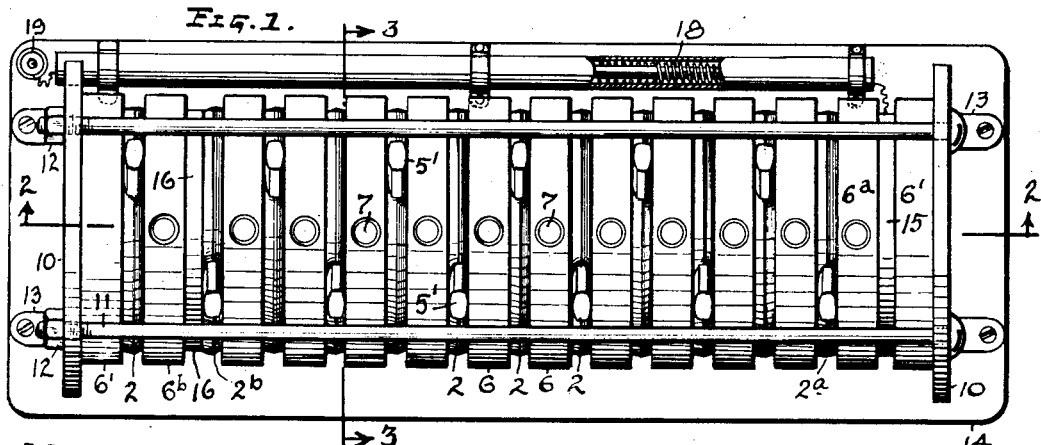
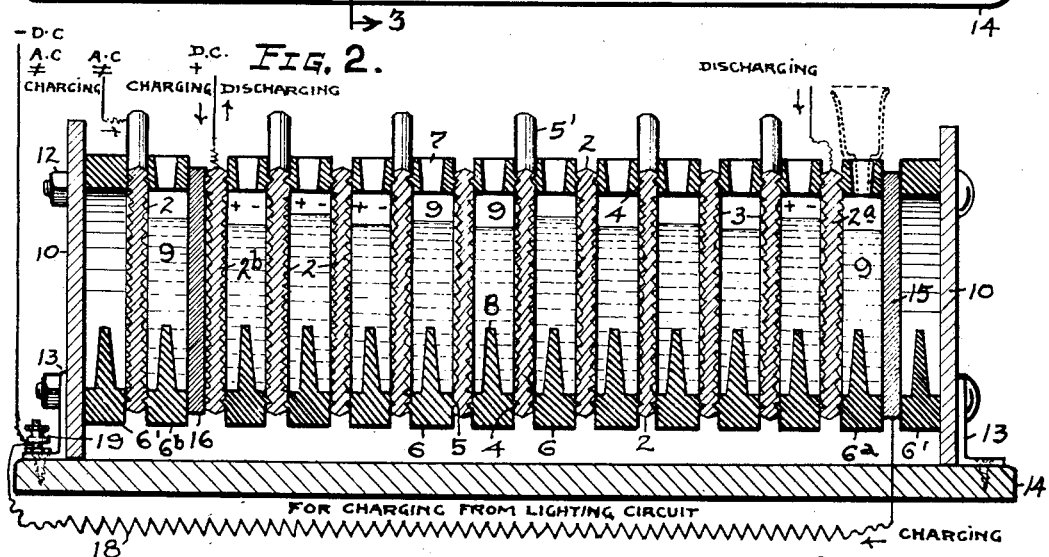
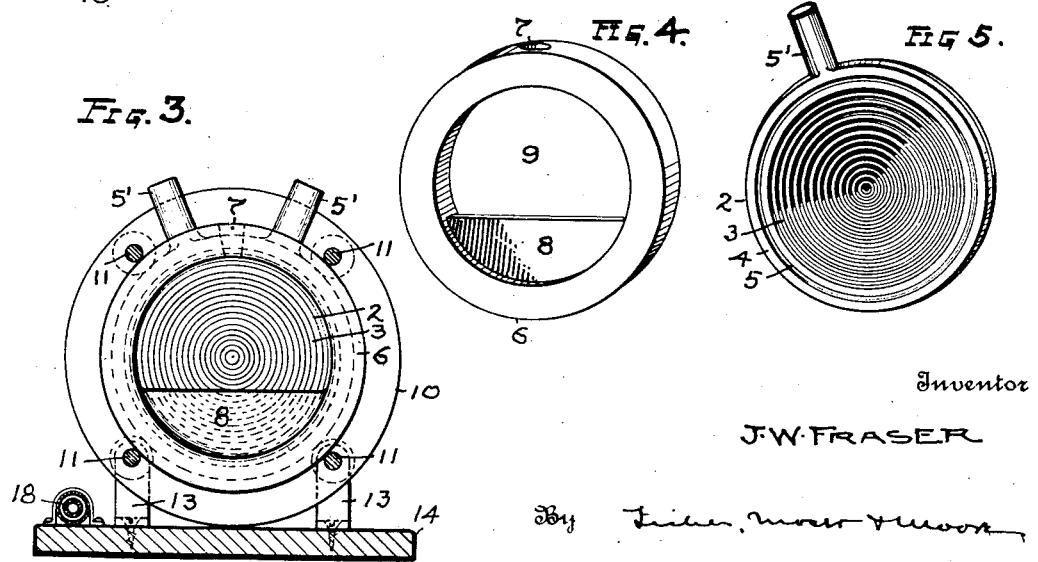
Inventor
J. W. FRASER Patented Feb. 17, 1925.

1,526,539

UNITED STATES PATENT OFFICE.

JOHN W. FRASER, OF CLEVELAND, OHIO.

BIFUNCTIONAL STORAGE BATTERY.

Application filed May 4, 1922. Serial No. 558,870.

*To all whom it may concern:*

Be it known that I, JOHN W. FRASER, a citizen of the United States, residing at Cleveland, in the county of Cuyahoga and State of Ohio, have invented certain new and useful Improvements in a Bifunctional Storage Battery, of which the following is a specification.

My object is to provide a simple and novel electrical storage battery for radio and other uses, predicating the invention on the idea of assembling any desired number of plates and sealing rings alternately in separable union to produce a series of cells or chambers side by side in which separate bodies of dilute sulphuric acid and other solutions may be sequestered from each other but used collectively in charging and discharging operations. As constructed the battery is relatively light and compact and portable and also convenient to handle without spilling the liquid contents or danger of breakage. It may also be extended or contracted in length to meet varying requirements and uses, and is particularly constructed to permit it to be charged by either direct or alternating current. This feature alone increases the field of usefulness of the battery, and the rectifying means to permit the use of alternating current in charging is incorporated within and forms a part of the battery itself without affecting or preventing charging with direct current. As arranged and assembled the plates are bi-functional, being positive on one side and negative on the other, or one side being the anode and the other the cathode, thereby reducing the number of plate units and economizing in space considering the voltage derived from a given number of such units. The dimensions of the battery are also reduced because of the elimination of separate containers or receptacles of glass, rubber, or celluloid for the plates, thereby also avoiding the risk of breaking such containers and the expense of up-keep incident thereto. In brief, a battery constructed according to my invention is capable of rough usage, and although particularly designed for radio work it can be used for electric bells, telephones, or wherever direct current is required.

In the annexed drawing, Fig. 1 is a top view of the battery, and Fig. 2 a vertical section thereof on line 2—2 of Fig. 1. Fig. 3 is a cross section on line 3—3 of Fig. 1. Figs. 4 and 5 are perspective views of a compressible rubber ring and a lead plate, respectively, which when clamped together in multiple form a complete secondary battery without the use of a vessel or container.

Thus, in constructing a battery I employ any desired number of round lead plates 2 which are either fashioned on their opposite flat sides to receive and retain a paste or are formed with faces of active material by the Planté method. As shown the opposite sides of each plate 2 comprise concentric ribs or corrugations 3 from the center to the circumference except where a flat border surface 4 having a circular groove 5 is retained or produced. A lug or terminal 5' extends radially outward from the circular edge of plate 2 which may be cast or molded or pressed in dies from sheet lead, and in a small radio battery this plate is relatively small or approximately two inches in diameter.

Another essential part of the battery consists of a flat rubber ring 6 which is soft enough to be compressible but of the same diameter or of slightly larger diameter than plate 2. A filling and vent opening 7 extends through the upper side of ring 6, and a tapered baffle wall or dam 8 is formed integrally with the circular body of this ring within the bottom side of its central round opening or chamber 9. This wall or dam 8 extends upwardly into opening 9 a greater or lesser distance where it may act as a barrier when the liquid level in the opening or chamber 9 drops below the crest of this wall, and it also serves to separate the adjacent lead plates so that active material falling from either plate can not collect within the bottom of opening 8 to short-circuit a battery consisting of any given number of such plates and rings placed alternately face to face and clamped tightly together.

As shown in the drawing a set of such lead plates and rubber rings may be clamped together by connecting separate flat end plates 10 of steel by a series of brass or steel tie rods 11 and tightening nuts 12, the tie rods also serving to align and support the rubber rings and the interposed lead plates in an upright or vertical position. These tie rods may be covered with insulating material, and short legs 13 may also be secured to the outside of the steel clamping plate 10 by the same tie rods and nuts. For greater convenience in handling the battery and to make it absolutely stable the legs may rest upon and be fastened to a flat base 14 of wood or insulating material, although the steel end plates may be square or other shape and provide stable rests without a base.

In order to insulate the active elements of the battery from the steel end plates 10, I may interpose in the assembly two end rings 6' of rubber, or I may use any other suitable insulating element or material at this place instead.

A pair of aluminum plates 15 and 16, respectively, are also clamped in series with the bi-functional lead plates of this battery, and preferably at opposite ends of the battery. Thus, the aluminum plate 15 is clamped between the last two rubber rings 6' and 6ª adjacent the last lead plate 2ª at the right of the battery, and the other aluminum plate 16 is clamped between the second rubber ring 6ᵇ and the second lead plate 2ᵇ at the left of the battery. The openings or chambers 9 in the rubber rings 6ª and 6ᵇ are exposed to the aluminum plates 15 and 16, respectively, and an ammonium phosphate or other alkali solution is confined within these two chambers, whereas all the other chambers intermediate the lead plates are filled with an electrolyte which may be a liquid or semi-liquid solution, or a gelatinous substance. The aluminum plates in the presence of an alkaline solution have the property of permitting an electric current to travel through the alkaline solution toward the aluminum but not in the opposite direction, in this way rectifying an alternating current into a pulsating direct current and making the battery self-rectifying. The efficiency of the rectifying agent may be low, inasmuch as the number of ampere hours demanded of a radio or similar battery is small and the charging rate is also small; in other words, the advantage of being able to charge the battery by either alternating or direct current from any lighting circuit is an advantage which more than offsets a low efficiency rectifying agent. In this connection it should also be understood that the battery is used or provided with a fixed resistance 18 between aluminum plate 15 and the charging post 19 to cut down the voltage from the lighting circuit to that required for the battery.

The lugs or terminals on alternate lead plates are placed at diverging angles at the upper side of the battery to facilitate the attachment of clips or connectors without interference, and this setting is obtained before the parts are tightly clamped together by merely turning or rotating the plates in opposite directions until the lugs are placed in the desired angular relations.

Any number of the plates and cells may be connected in series, to obtain any voltage from two volts up to the maximum capacity of the battery as assembled. In filling the separate cells or chambers a funnel or hose may be inserted into the filling opening in each rubber ring, and these openings may also be used in testing the electrolyte.

Rectifying may also be accomplished by omitting aluminum plate 16, lead plate 2ᵇ and ring 6ᵇ, using only one aluminum plate 15 and the alkali solution within rubber ring 6ª.

What I claim, is:

1. A bi-functional storage battery, comprising a series of alternately-arranged active plates and chambered insulating members clamped together and providing separate cells for the electrolyte between adjacent plates, each plate having a terminal lug and the lugs on alternate plates being arranged in offset relation.

2. A bi-functional storage battery, comprising a series of active plates each having a projecting lug, a series of rubber rings having baffle walls, and means adapted to clamp said plates and rings alternately side by side with the lugs on alternate plates offset on diverging lines, the spaces between the plates forming sub-divided sealed cells adapted to contain an electrolyte.

3. A bi-functional storage battery, comprising a series of active plates having terminal lugs, a series of rubber spacing rings having filling openings therein, and means adapted to clamp said plates and rings alternately side by side to provide separate sealed electrolyte chambers in the rings between adjacent plates.

4. A bi-functional storage battery, comprising a series of active plates and rubber spacing rings arranged side by side to provide a series of electrolyte chambers, and current rectifying means, all said parts being clamped together to provide a self-rectifying battery.

5. A bi-functional storage battery, comprising a series of active plates and an aluminum plate mounted in spaced insulated relation to provide a series of electrolyte chambers and an alkaline solution chamber.

6. A bi-functional storage battery, comprising round lead plates, relatively thick rubber rings interposed between said plates to provide electrolyte chambers, an aluminum plate and spacing ring adjacent one of said lead plates to provide an alkaline solution chamber, and means adapted to clamp said plates and rings separably together.

7. A bi-functional storage battery, comprising a series of lead plates and spacing insulating members interposed between said plates adapted to provide electrolyte chambers, and an aluminum plate and spacing member adjacent the lead plate at one end of the series of such plates to provide an alkaline solution chamber at one end of the battery.

8. A bi-functional storage battery, comprising a series of active plates in spaced relation having aluminum plates associated with the active plates at opposite ends of said series to provide rectifying means within the battery adapting the battery to be charged with either direct or alternating current.

9. A bi-functional storage battery, comprising round lead plates having lugs, a series of rubber rings adapted to be interposed between said plates, said rings having filling openings centrally at their top and a baffle wall within the bottom side of the opening within the ring, and end clamping plates and longitudinal tie-rods and clamping means adapted to clamp said lead plates and rings in sealing engagement the lugs on alternate plates extending upwardly at an inclination in different directions and at opposite sides of the centrally located filling openings.

10. In a storage battery the combination of a pair of end plates and a number of normally vertical spacing blocks disposed intermediate said end plates, each of said spacing blocks being provided with an aperture extending entirely through it and with a filling hole emerging into said aperture, each of said apertures being of decreasing width as it approaches its hole, a number of battery plates interposed between the spacing blocks and each provided with an anode face in proximity to one spacing block and with a cathode face in proximity to the next successive spacing block, and means for clamping together said spacing blocks and said battery plates so as to render the same fluid-tight.

11. A secondary battery comprising in combination, a series of normally vertical frames, the aperture of each of said frames being of decreasing width as it approaches a corresponding vent opening provided in the upper part of the frame, a plurality of battery plates interposed between said frames and cooperating therewith to form a plurality of receptacles for the electrolyte, and means comprising end members and tension rods connecting the same for clamping said frames and plates together.

In testimony whereof I affix my signature.

JOHN W. FRASER.